United States Patent [19]
Zulch

[11] Patent Number: 5,966,730
[45] Date of Patent: *Oct. 12, 1999

[54] BACKUP SYSTEM FOR COMPUTER NETWORK INCORPORATING OPPORTUNISTIC BACKUP BY PRIORITIZING LEAST RECENTLY BACKED UP COMPUTER OR COMPUTER STORAGE MEDIUM

[75] Inventor: Richard C. Zulch, Orinda, Calif.

[73] Assignee: Dantz Development Corporation, Orinda, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,620

[22] Filed: Oct. 30, 1996

[51] Int. Cl.$^6$ ............................ G06F 11/20; G06F 17/30; G06F 11/16

[52] U.S. Cl. ............................... 711/162; 711/4; 711/118; 707/204; 707/202; 707/205; 709/200; 709/203; 395/181; 395/182.02

[58] Field of Search ................................ 711/4, 118, 162, 711/161; 395/180, 181, 182.01, 182.02, 182.03, 182.04, 200.78, 200.3, 200.37, 680, 672, 673, 670; 707/204, 202, 205; 709/200, 203, 100, 102, 103, 300; 340/825.06, 825.07, 825.08

[56] References Cited

U.S. PATENT DOCUMENTS

| | | | |
|---|---|---|---|
| 5,133,065 | 7/1992 | Cheffetz et al. | 395/181 |
| 5,241,670 | 8/1993 | Eastridge et al. | 711/162 |
| 5,375,232 | 12/1994 | Legvold et al. | 711/162 |
| 5,448,718 | 9/1995 | Cohn et al. | 711/4 |
| 5,454,099 | 9/1995 | Myers et al. | 711/162 |
| 5,537,585 | 7/1996 | Blickenstaff et al. | 707/205 |
| 5,649,196 | 7/1997 | Woodhill et al. | 707/204 |
| 5,659,614 | 8/1997 | Bailey, III | 380/4 |
| 5,675,725 | 10/1997 | Malcolm | 395/182.04 |
| 5,678,042 | 10/1997 | Pisello et al. | 395/184.01 |
| 5,751,997 | 5/1998 | Kullick et al. | 711/162 |
| 5,758,359 | 5/1998 | Saxon | 707/204 |
| 5,778,165 | 7/1998 | Saxon | 395/182.02 |
| 5,778,395 | 7/1998 | Whiting et al. | 707/204 |
| 5,799,322 | 8/1998 | Mosher, Jr. | 707/202 |
| 5,813,009 | 9/1998 | Johnson et al. | 707/100 |

OTHER PUBLICATIONS

Central Point Software, "Central Point Backup, Hard Disk Backup for Windows and DOS", ver. 7, 1991.

Central Point Software, "Central Point Backup, Hard Disk Backup for Windows and DOS", v.7, 1991.

*Primary Examiner*—Frank J. Asta
*Assistant Examiner*—William C. Vaughn, Jr.
*Attorney, Agent, or Firm*—Townsend and Townsend and Crew LLP

[57] ABSTRACT

A backup system is operated in accordance with a server or intelligent storage data controller containing a pre-written script governing a backup protocol. This script designates the possible source of data for backup that could become visible on the network and the possible storage sets that may be available in the storage repository. Preferably, the script also contains a timetable for when the script should be active, and wrap up interval of time for intelligently terminating a particular backup operation. In operation, the total number of accessible data sources (usually computers) and the total number of storage media destinations (for example available tapes mounted in tape drives) are generated to list possible source to storage paths. Utilizing the script, the possible source to storage paths are prioritized with the least recently backed up source as dated by the available media having first priority for backup. Once prioritization has occurred, backup is initiated in the order of prioritization to the first available of the designated source to storage media paths. This designation of source to media available paths continues down through the prioritized source to storage paths, initiating backup when the source and media are available. As each backup is completed, a new prioritization of source to media paths occurs responsive to location of the last backed up source, with backup occurring on the first available source to media path. Scripts can be tailored to prioritize backups dependent upon time of day. There results a fully automated backup which once programmed does not require constant supervisor monitoring.

17 Claims, 6 Drawing Sheets

```
                                                    ┌─ T₁
┌─────────────────────────────────────────────┐
│  Source computers ─14                        │
│       First portable computer                │
│       Second portable computer               │
│                                              │
│  Destination sets of storage media ─16       │
│       Second set of storage media            │
│                                              │
│  Selection criteria ─17                      │
│       Include all files                      │
│                                              │
│  Scheduling criteria ─19                     │
│       Back up as often as every 1 day        │
│       Script is active every day, from 5 pm to 7 am │
└─────────────────────────────────────────────┘
```

*FIG. 3A.*

```
                                                    ┌─ T₂
┌─────────────────────────────────────────────┐
│  Source computers ─14                        │
│       First portable computer                │
│       Second portable computer               │
│                                              │
│  Destination sets of storage media ─16       │
│       First set of storage media             │
│       Second set of storage media            │
│                                              │
│  Selection criteria ─17                      │
│       Include sales book file only           │
│                                              │
│  Scheduling criteria ─19                     │
│       Back up as often as every 1 day        │
│       Script is always active                │
└─────────────────────────────────────────────┘
```

*FIG. 3B.*

BACKUP SYSTEM FOR COMPUTER NETWORK INCORPORATING OPPORTUNISTIC BACKUP BY PRIORITIZING LEAST RECENTLY BACKED UP COMPUTER OR COMPUTER STORAGE MEDIUM

This invention relates to computers being backed up at optimal times. More particularly, a system, process and apparatus is disclosed wherein computer backup occurs when certain computer storage media and backup storage media are simultaneously available, under the control of computer programs referred to as "scripts." Backup is generally prioritized to the least recently backed up computer or computer storage medium and to availability of the computer or data source and the particular backup media designated by the script.

BACKGROUND OF THE INVENTION

The need for the backup of computers is well known. Simply stated, computers have hard disks containing much valuable data. Unfortunately, no such storage technology is completely free from the possibility of failure, nor is any immune to loss by theft, fire, or natural disaster. In the case of such failure or loss, all data unique to the computer hard disk is generally permanently lost. The goal of any backup system is to maintain the controlled redundancy of data to avoid and minimize the loss of unique data.

In current practice, computer backup systems are of two distinct types: continuous backup and batch-oriented backup. Continuous backup systems copy data simultaneously and continuously while the data is being created or modified. Batch-oriented backup systems operate at distinct points in time to copy all selected data at that point in time. Each of these types has advantages and disadvantages, and some installations make use of both approaches simultaneously. This invention pertains to batch-oriented backup only.

Batch-oriented backup systems may be further subdivided into two types: local backup and network backup. Network backup systems share the archive storage media among more than one computer, while local backup systems do not.

It should be understood that while the case of the network computer backup is used in these descriptions, this invention is equally applicable to the simpler case of a local backup system. Also, the computer memory is referred to here specifically as a hard disk, but a different memory technology such as a semiconductor disk emulator would be equally applicable.

I have developed a backup system for computers. This system is set forth in my U.S. Pat. No. 5,150,473 entitled DATA STORAGE FORMAT FOR ADDRESSABLE OR SEQUENTIAL MEMORY MEDIA, issued Sep. 22, 1992. To summarize, a data archive format is disclosed for archiving computer information taken from computer sessions, each session being of the form that includes a so-called "root directory" with appropriate branches leading to each discrete file or subfile within the computer session. The archive format includes the transfer of data to an archive media member, which archive media member can alternatively be addressable or sequential memory and can be recordable in either a re-writable or write once manner. When data is archived, a separate and resident archived directory is created in the immediate memory of the computer having the data to be archived, the purpose of this separate and resident directory being to maintain high speed during reading and writing of the archived data. This separate and resident archive directory is updated during the archiving process, used to access and retrieve the archived data during the recovery process, and distributed through the archive media in a non-predictive, largely non-redundant but recoverable format. Upon failure of the memory containing the separate and resident archive directory, reconstruction of the separate and resident archive directory is possible.

In current practice, a network computer backup system consists of one or more archive storage devices connected to a computer on the network, and thus shared among a set of computers similarly connected. The computer with the storage devices, known as the backup server, contains a computer program to transfer data from the other computers, known as the clients or sources, to the local storage devices.

In what follows, I offer what seems a simple analysis of backup of the prior art. Unfortunately, backup is a remote field of computer science that not only suffers neglect but additionally has its common problems not set forth with clarity and therefore not understood. It will be understood therefore that in stating the faults of the prior art, I am delineating the problem to be solved. And since discovery of the problem to be solved can constitute invention, I claim invention in being first in setting forth both problem and solution that this invention offers to the computer data backup field.

The prior art exhibits two approaches to sharing the backup computer among the various client computers. The first is to allow the user of each client computer to initiate a backup by contacting the backup computer and requesting to store data. This is known as the "push" model. When the backup computer is busy, the client computer is told to wait, generally in first-come first-served order, until the backup computer becomes available. With this scheme, the client backup requests are almost always clustered at certain times, resulting in delays for everyone. Also, client backups must be copied to the currently available storage media, where the random nature of the client requests results in random distribution of their data on the media. This makes it difficult to restore the data for a single client. Finally, users usually forget to initiate back ups on a regular schedule, especially if it involves delays.

The second sharing approach is the "pull" model, where the backup computer accesses the client computers according to a preset scheduled defined by an administrator. For example, computers are left on at night. The backup system starts up at a certain time, accessing the computers sequentially, and copies their data to storage media. When the computers' users return in the morning, backup has occurred. While the clustering effect and random data distribution of the push model are avoided, a client will not be backed up if it is not available at the given time.

Unfortunately, many computers are now portable. They are only occasionally connected to a network, and thus may never be available at the predetermined time that a "pull" backup would take place. But "push" backups rely on user discipline and have clustering and availability problems. The full magnitude of these issues can be considered by taking the case of the salesman taking orders on a portable computer.

First, the salesman computer is rarely in the office where connection to the network—and hence the backup system can occur.

Secondly, when the salesman is in the office and connected to the network, it is usually at times when all other salesmen are in the office and connected to the network. For example, it is common for salesman to be in the office at the beginning of the day and the end of the day. Salesman are not usually in the office in the middle of the day because they are out selling.

Third, trying to have the salesmen themselves initiate backup is generally not satisfactory. Typically, all salesmen want to back up at the same time. For example, backup among a sales force is common in the late afternoon. Frequently, and rather than wait for backup to finish, salesmen disconnect their respective computers from the network and leave.

Fourth, and considering the case of the organization that has a large number of sales personnel, backups do not statistically spread themselves out. Specifically, when the largest number of salesmen is present, the largest number of back ups are likely to occur.

A final complication to the backup task, ill-handled in the prior art, is that the amount of data and thus the time required to copy it is highly variable among various computers, and usually unknowable in advance of the backup. For example, a backup operation may complete in less than a minute when only a small file has changed since the previous backup, while the subsequent backup of the same disk may find that virtually every file has changed, requiring hours or even days to complete the copying operation. Also, the typical administrator will need to regularly perform a "full backup", where all source data is copied to a set of new or erased media. Because copying such large volumes of data may use significant resources, making it difficult or impossible for users to share the same computer or network, administrators of the traditional "pull" backup will often attempt to back up at night or on weekends when usage is light. But all too often the backups are still running when this "backup window" has ended, adversely affecting the users or requiring the administrator to terminate the backup manually. As the quantity of data storage inevitably increases, the backup duration eventually reaches the point of always exceeding the backup window, where the data copied from the last computers or the last part of the disk drive will then never be backed up, a problem known as starvation.

Starvation is easy to understand. In the typical pull backup, all computers on the network are backed up in the same order in each backup window. Naturally, those computers at the head of the list will be backed up first. Those computers at the end of the list will be backed up last. And where the interval required for a continuous backup exceeds the backup window available, backup will not occur for those computers at the end of the backup list. These computers will be "starved" in the sense that they will never be backed up. And each time backup is initiated, it will occur in the same order on the available computers with the same starvation problem resulting.

SUMMARY OF THE INVENTION

A backup system is operated in accordance with a backup server containing an administrator written script, backup protocol, or program. The backup server is also known as the storage data controller and the intelligent controller. This script designates the possible client computers with data sources that may be locally accessible or visible on the network and the possible backup storage media destinations that may be used to store data from these data sources. It also specifies a backup interval which is the minimum time between backups. Preferably, the script also contains a time table for when the script should be active, and wrap up interval of time for terminating a particular backup.

In operation, when backup is initiated, the total number of client computers having accessible data sources and the total number of storage media destinations (for example available sequential tapes in a tape drive) are generated in a "trigger list." Utilizing the script, the trigger list is prioritized with the least recently backed up client computer, —as dated by the last backup time using this script—having first priority for backup. Once prioritization has occurred, backup is initiated in the order of prioritization to the first available of the client computers to storage media paths. Once a client computer is backed up, it is ineligible for further backup until the script's backup interval elapses.

The reader should note that the "first available" of the client computers to storage media paths is utilized. Where the client computer or storage media is not available, bypass of that particular designated path occurs. The backup then defaults to the next in order client computer to storage media path to examine that computer for availability.

This designation of client computer to media available paths continues down through the prioritized client computer to storage media paths, initiating backup when the client computer and storage media are available. As each backup is completed, a new prioritization of client computer to storage media paths occurs responsive to location of the last backed client computer, with backup occurring on the first available client computer to storage media path.

More than one script may be active at any given time of day, and the client computer to storage paths of all active scripts are interleaved and compared together for purposes of prioritization. When a backup is begun, the user of the client computer is given the opportunity, for a limited duration, to defer the backup to a different time. The server stores this desired time and considers the source for backup only after that point. This mechanism is also used by the client user to initiate a backup as soon as possible, by setting the desired backup time to the current time, providing the traditional "push" functionality. When the server is idle, it polls the clients to look for adjusted backup times, whether a deferral or an early request. There results a fully automated backup which once programmed does not require constant supervisor monitoring.

The system is optimized to back up the occasionally connected computer. Further, the administrator does not have to change system settings or scripts when inserting different storage media; presence of new media redefines the prioritized source to media paths. Use of storage media is time distributed in that when more than one of the script's designated media sets are available, that medium set which was least recently used will be chosen, as dated by the last backup using this script and source to each destination set. This has the desirable behavior of automatically rotating backups among the available sets. Where a server with backup media has magazine availability of media, this will result in the oldest used storage media qualifying for most current use Thus, all earlier media having storage sets will be maintained, a result naturally desired. Each script further lists selection criteria that can be used to restrict the data transferred when a backup is performed for a source to storage media path defined by that script.

Scripts may be made active or inactive on a schedule. Scripts that specify backups which in operation adversely affect the performance of computers or networks, for example a file server, may be set to be active only when the usage of such computers or networks is light, for example at night or on weekends. Any current backup initiated by a script will be terminated when the script becomes inactive.

The system's prioritization scheme will ensure that if a particular computer is not backed up during the backup window defined by a script's active time on, it will advance to a higher priority the next backup session until it is eventually copied completely, eliminating the prior art's starvation problem.

The elimination of the so-called starvation problem is not trivial. Beta site use of actual computer programs utilizing this described protocol have been surprising. Once this system outlined herein is understood, users request and demand that the system of this protocol be used elsewhere. I have personally encountered this because this program is currently only available for one type of personal computer. Administrators having more than one type of personal computer wish to extend the system herein generically to all computers under their control.

Provision is made to prevent a script's active/inactive schedule from uselessly initiating a backup just before the script becomes inactive. This so-called "wrap up interval" prevents the script from initiating an additional backup when the time remaining before the script becomes inactive is less than the specified duration.

In addition to the above scripts, traditional "pull" backups may be scheduled for specific times, and will execute when the server has completed any current operation at that time. This function is employed by the administrator when specific schedules are appropriate, such as for regular full backups that erase and reuse backup storage media. The system enjoys the advantages of both the traditional "push" and "pull" approaches to sharing the backup computer with the compromises of neither.

Finally, the backup system has unique synergy with my U.S. Pat. No. 5,150,473 entitled DATA STORAGE FORMAT FOR ADDRESSABLE OR SEQUENTIAL MEMORY MEDIA, issued Sep. 22, 1992. First, the preferred backup engine allows multiple separate sets of archive media to be maintained independently, each with its own resident archive directory. This allows the hard disk memory of a particular computer to be backed up to more than one set of media with the desirable redundancy of maintaining a particular computer memory file in more than one set, but without the undesirable redundancy of storing said file more than once in a single set of archive media. Second, the date when a computer memory session was last stored to each archive media set is easily accessible in the resident archive directory of the set. Third, assuming total loss of data at the source, it is trivially easy to determine the most recent backup, to which set of archive media it was copied, what files were present as of the last backup, and to reconstruct at the source the original data from one or more media.

BRIEF DESCRIPTION OF THE DRAWINGS

FIGS. 3A and 3B are block diagrams illustrative of the scripts utilized for backup with each script containing its own source "client" computers, destination storage media, file selection criteria, and scheduling criteria for activation of the script;

DESCRIPTION OF THE PREFERRED EMBODIMENT

Figure 1:
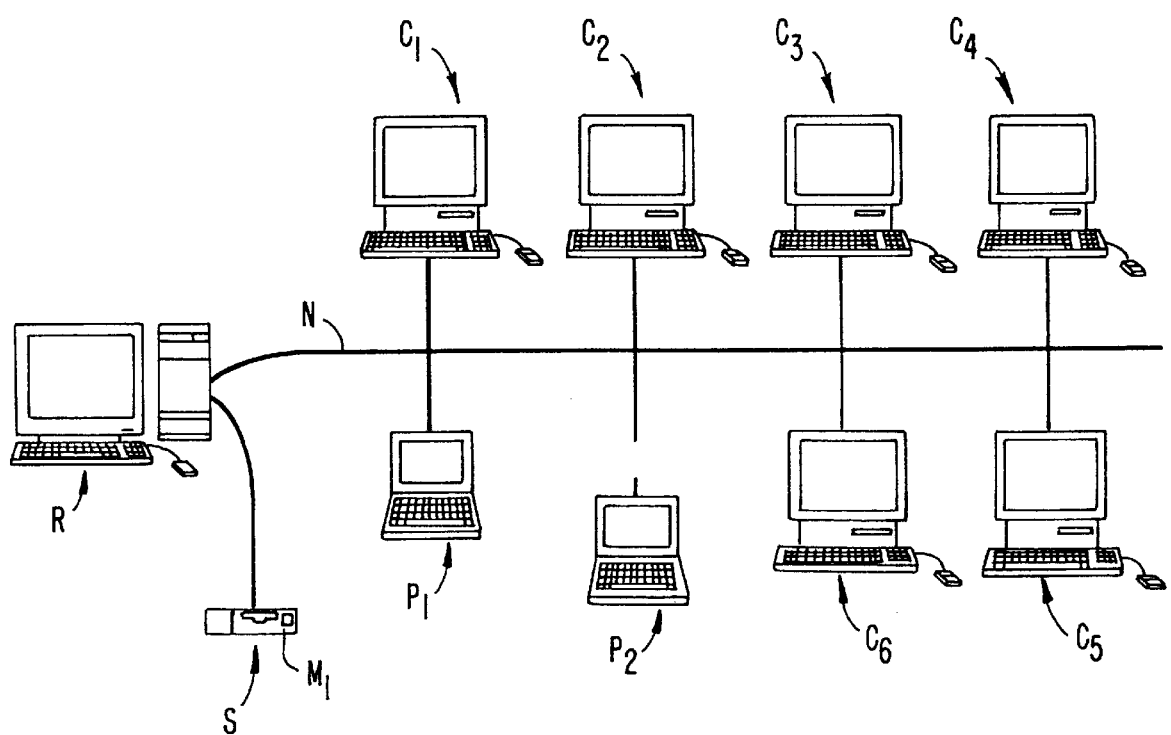
FIG. 1 is a schematic of a computer network illustrating a back up server, six permanently connected client servers and illustrating a first portable computer being connected to the network and a second portable computer being withdrawn from the network.

Referring to FIG. 1, the schematic of network N is illustrated. Regularly connected computers $C_1$–$C_6$ are illustrated connected through network N to server R. Server R has storage media engine S having first set of storage media $M_1$ available for backup. Thus the server R and the storage media engine S become together the storage data controller and intelligent controller of this disclosure. As can be seen, second script $T_2$ specifies use of second set of storage media $M_2$.

This particular network includes first portable computer $P_1$ that has just been connected to network N and second portable computer $P_2$ that has just been disconnected from the network N. It will be understood that this backup protocol has particular applicability to portable computers. However, it will be as well understood that where the window available for back up does not exceed the required time for copying of data, this invention also has great utility. For example, where regularly connected computers $C_1$–$C_6$ have so much data that the backup interval will not allow computer $C^6$ to be backed up, upon the next backup interval, backup will commence with the unbacked up computer $C^6$. —for example computer $C_6$— upon the next backup interval backup will commence with the unbacked computer $C_6$.

It will be apparent from reading my U.S. Pat. No. 5,150,473 issued Sep. 22, 1992 entitled DATA STORAGE FORMAT FOR ADDRESSABLE OR SEQUENTIAL MEMORY MEDIA that storage media engine S and media $M_1$ can be of any desired format. Specifically, these members can be serial or random access and can be tape, disc, or electronic memories. Further, the records can be either write once media or media that is over written.

Figure 2:
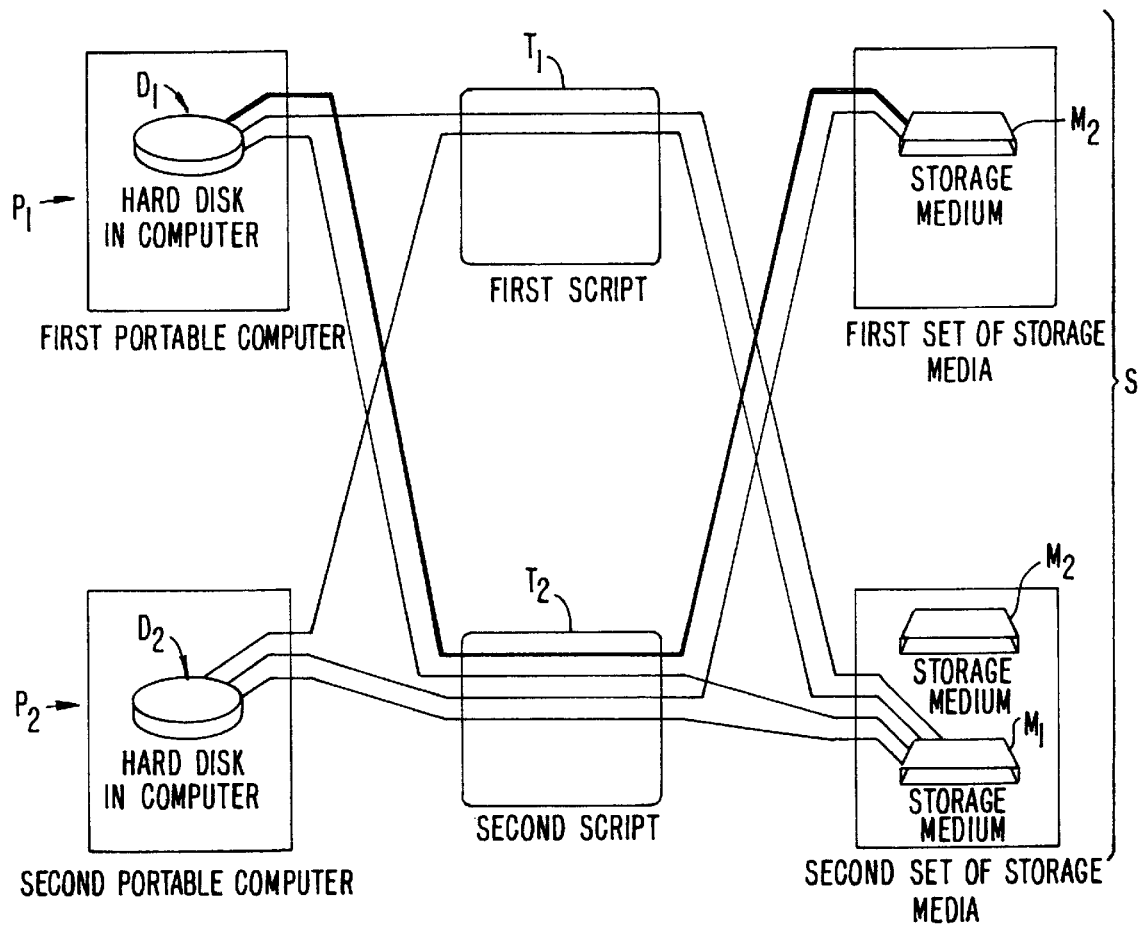
FIG. 2 is a schematic diagram of a source to media path through an administrator written script, there being illustrated two sources, two scripts and two sets of storage media.

Referring to FIGS. 2 and 3, these figures are respectively a diagram of a script and block diagrams representing the scripts. Thus, in the conceptual sense, these figures are interchangeable.

Referring to FIG. 2, first portable computer $P_1$ has disc $D_1$. As will be remembered from FIG. 1, first portable computer $P_1$ has just been connected to network N. Second portable computer $P_2$ has disc $D_2$ and has just been disconnected from network N.

Referring to FIG. 3, first script $T_1$ is programmed for general backup of all files on portable computers $P_1$ and $P_2$. Second script $T_2$ addresses the problem of the salesmen's first and second portable computers $P_1$ and $P_2$. Specifically, anytime that a salesman's computer is plugged into the network, backup of the order book subdirectories of the computer memory will occur.

Reviewing FIG. 3, the components of first script $T_1$ and second script $T_2$ can be seen. Each script contains list of source computers 14, destination sets of storage media 16, file selection criteria 17, and scheduling criteria 19. Taking the case of second script $T_2$, it can be seen that server R and storage media engine S effectively back up once a day the sales order book section of first portable computer $P_1$ and second portable computer $P_2$.

It will be understood that additional script could be used. They are not set forth here as they would render a needless complication in the understanding of the principles of this invention. For example, such a third script would include regularly connected computers $C_1$–$C_6$. For additional example, regularly connected computers $C_1$–$C_6$ could be placed in first script $T_1$.

Figure 4:
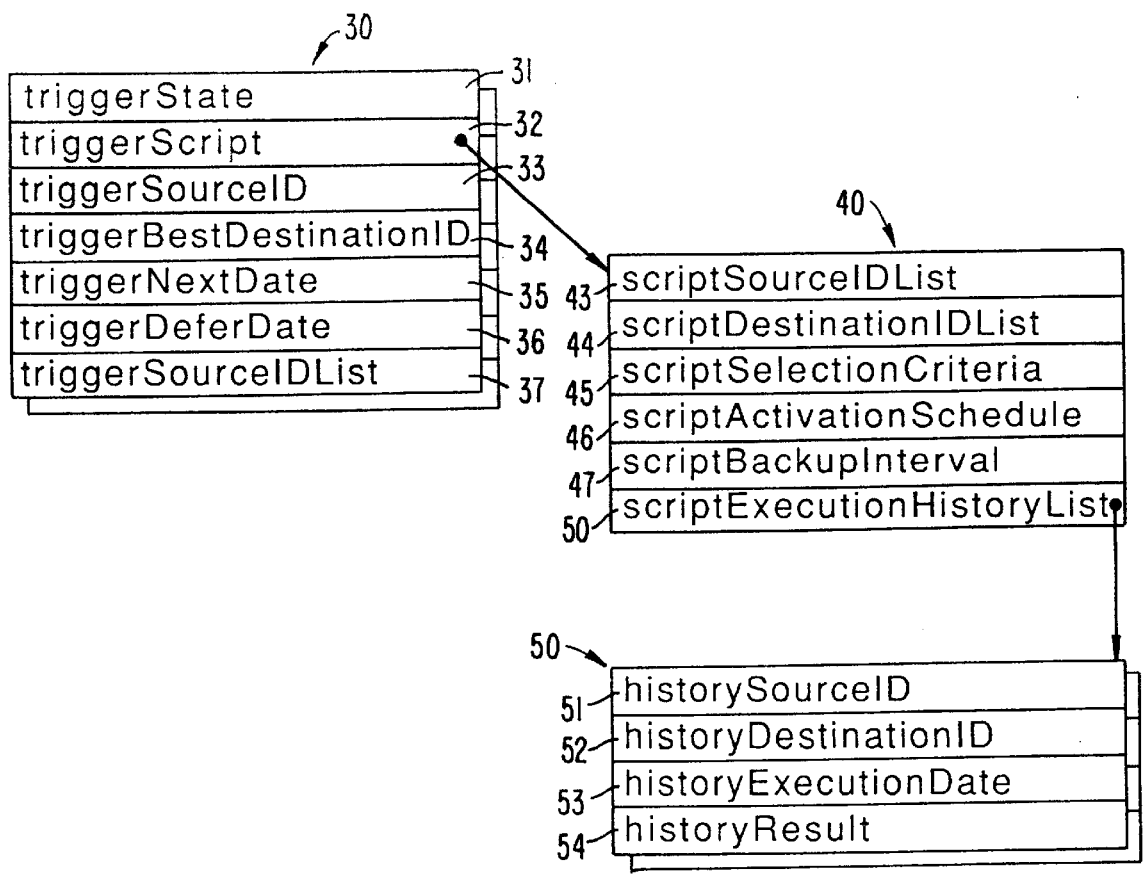
FIG. 4 is a schematic of the control information maintained by the server with the trigger record having an expanded portion displaying a script record and the script record available for back up portion illustrated as the history record.

Referring to FIG. 4, so-called trigger records 30, script records 40, and history records 50 are all maintained in memory in server R controlling storage media engine S.

It should be understood that maintenance of trigger records 30, script records 40, and history records 50 is not indispensable to operation of or access to the required backup protocol and saved information. Even in the case where these records become a total lost, all that is required is that the scripts be present and the backup procedure initiates itself from the beginning.

First it is necessary to understand the number of trigger records 30. Going to FIG. 3 at first script $T_1$, it will be understood that for each script and each designated source a separate trigger records 30 will be maintained. Taking the case of first script $T_1$, two trigger records 30 will each be maintained.

Second, trigger records 30 are produced as a result of the particular script entered by the system administrator. Once the particular script, first script $T_1$ or second script $T_2$ is generated, these records are prepared.

Trigger state 31 indicates the status that the trigger occupies at any given interval of time. For example, presuming that first portable computer $P_1$ remain plugged into the network, the time of day is after 5:00 pm but before 7:00 am in the morning, and backup has not previously occurred that particular day, full backup of first portable computer $P_1$ will occur. The trigger state will be "on." Otherwise the trigger state 31 will be indicated as "off."

Trigger script 32 will be the particular script that the trigger refers to. In this case it will be first script $T_1$. It will be realized that trigger records 30 are in effect multiplied by the particular sources referred to (in this case first portable computer $P_1$ and second portable computer $P_2$) and the scripts referred to (in this case a complete set of records would include first portable computer $P_1$ and second portable computer $P_2$ each having trigger records 30 for first script $T_1$ and second script $T_2$).

Trigger source 33 is the first portable computer $P_1$. This computer would have a specific "ID" (identification).

Trigger best destination 34 would be the "ID" of the specific media being utilized for the backup. In the case of first script $T_1$ this would be second set of storage media $M_2$.

Trigger next date 35 is the calculated next backup of date based upon the previous execution history. This can be explained with respect to history records 50. Simply, stated, taking the date that a successful backup has previously occurred, the program calculates that date on which a backup can next occur. Presuming that a backup of first portable computer $P_1$ has just been successfully completed using first script $T_1$, the next date will be exactly 24 hours in advance of the instant the backup was successfully completed.

Trigger defer date 36 is an option placed into the system by the remote computer. Say the operator of first portable computer $P_1$ wishes to request backup. This being the case, trigger defer date 36 will have the current time entered. Alternately, a delayed date can be entered into trigger defer date 36—as where the operator of first portable computer $P_1$ is using the computer and does not wish to have the computer slowed by task sharing of backup. Alternately, the user can be leaving for lunch—and thus presenting an ideal time for backup. In this case he can set the deferral time to the present time and will soon be considered for backup.

Trigger source list 37 is a refinement. In present operating systems, computers may have multiple memories. All these memories need to be backed up. This being the case, and presuming that regularly connected computers $C_1$–$C_6$ each had multiple memories, the computers would be looked at as effective containers of the memory and trigger source list 37 would designate the particular computer memory that would have to be backed up. Take for example, the case of a removable disc drive. The backup protocol of this invention will literally "lay in wait" for the removable memory to be connected—and the minute connection occurred within the purview of a particular script, backup will occur.

Script records 40 are a part of trigger script 32. These effectively constitute all server R needs to know in response to trigger records 30 which were generated from the particular scripts.

Script source identification list 43 contains the identification of the particular sources. In this case it could be first portable computer $P_1$. Likewise, script destination identification list 44 contains the destination. For example in the case of first script $T_1$ this would be second set of storage media $M_2$.

Script selection criteria 45 would be those files of the computer that are to be backed up. For example, first script $T_1$ specifies all files while second script $T_2$ goes to the sales order files of the portable computers.

Script activation schedule 46 constitutes that period of time that the script is active. For example, in the case of second script $T_2$, the script is always active to capture vital sales data whenever one of the portable computers is connected.

Script backup interval 47 is the time between backups. For example, taking the case of second script $T_2$, backup of the order section of the portable computer would occur once every 24 hours.

History records 50 are for the most part self explanatory. Source identification 51, destination identification 52, and execution date 53 are all important. Special attention is directed to history result 54.

It is important to know whether a particular backup was successful. For example, an error may have interrupted a backup. Say the owner of first portable computer $P_1$ returns from lunch during a backup session and disconnects first portable computer $P_1$ from the network to make a sales call. History result 54 would indicate that backup was not successful and utilize this in the calculation of trigger next date 35. Specifically, where backup fails, a default one hour delay is entered and trigger next date 35 is calculated from execution date 53 plus one hour! It will be understood that where for any reason a backup fails—waiting the entire between backup interval just to try and obtain backup would defeat the purpose of this protocol.

Figures 5A, 5B:
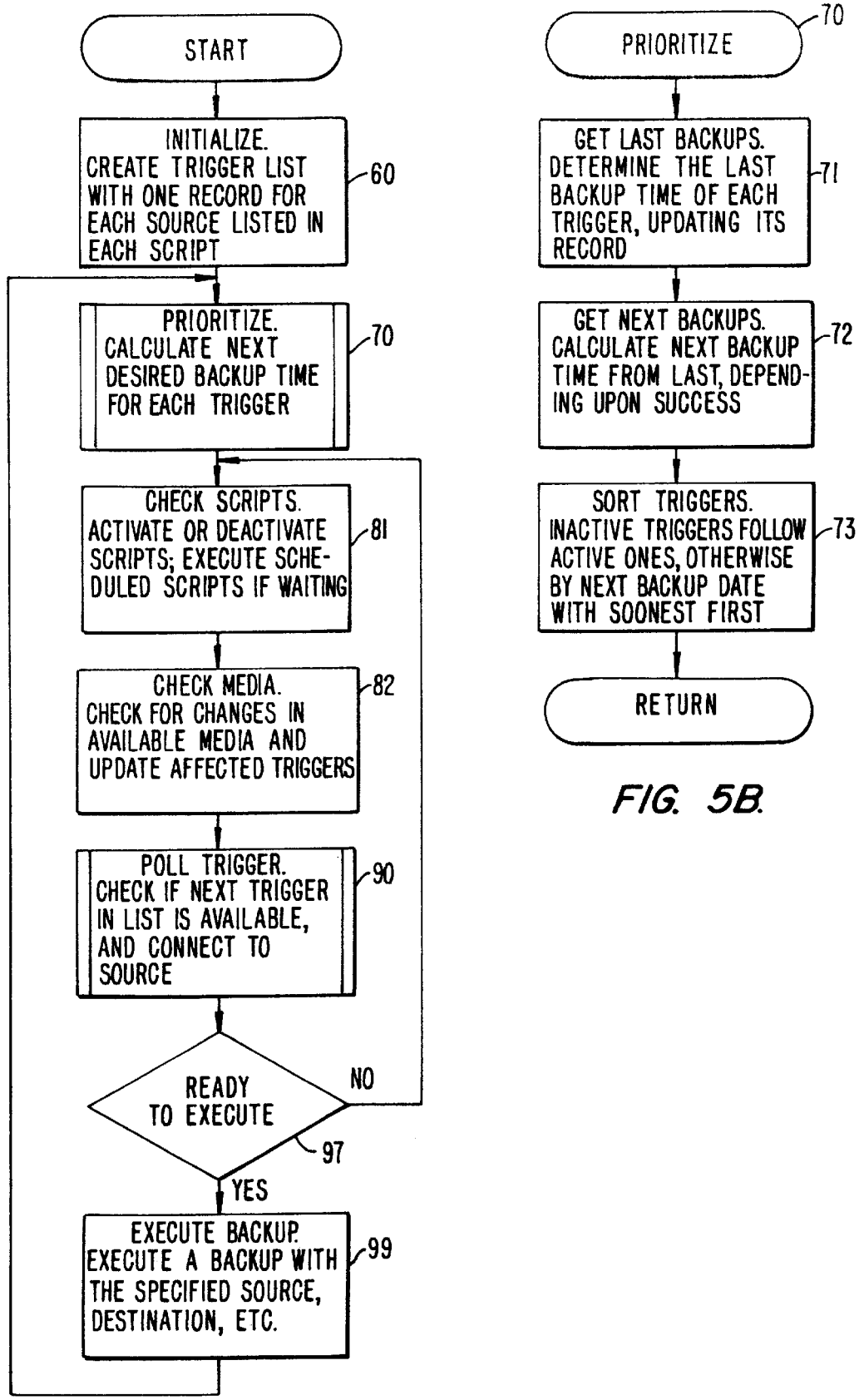
FIG. 5A is the logic flow for operation illustrating the complete backup execution.
FIG. 5B is the required prioritization subroutine.
Figure 6:
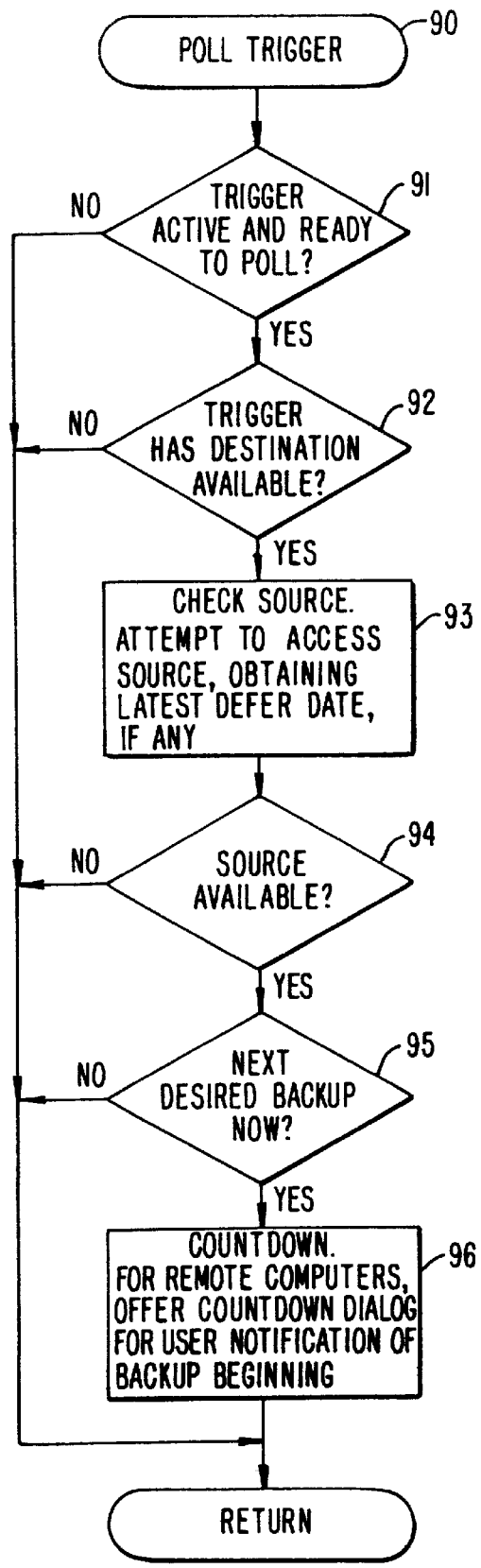
FIG. 6 is the subroutine for the poll trigger operation.

Having set forth the individual administrator created scripts, and then trigger records 30 created in server R responsive to those scripts, followed by script records 40 and history records 50 generated by server R, the logic of the controlling program can now be set forth with respect to FIGS. 5A, 5B, and 6.

Referring to FIG. 5A, initialize 60 includes assembling all of the records described in FIG. 4 and filling these records in with default information. Default will only occur once—that is when the program is started. Thereafter, program operation will produce records unique to the network, sources, and data transferred.

Prioritize 70 relates to trigger records 30. This requires examination of the subroutine set forth in FIG. 5SB. Specifically, the last successful backup is terminated utilizing history records 50 especially at execution date 53 and history result 54. Then the next backup time is computed and entered at trigger next date 35. Finally, taking trigger next date 35, trigger records 30 are sorted in the order in which backup is desired.

It is to be noted that if the particular script is inactive, those records will be placed at the end of the prioritized list and not used. Otherwise, a prioritized "wish list" will be created. Presuming that the source (i.e. particular computer) and destination (particular media) is available, backup will occur. As will here in after be developed, where either the source or the media is not available, the next trigger record 30 will be considered and the not available routine bypassed.

The next three steps, check scripts 81, check media 82, and poll trigger 90 constitute a loop. This loop will consider each trigger record 30 sequentially in order of prioritization. It is to be understood this accesses the prioritized trigger records 30 on the basis of "availability." Where either source or media of trigger record 30 having higher priority is not available, the next high rated source to media trigger record 30 will be polled.

Check scripts 81 determines if a script is activated or deactivated. For example, at 7:01 AM, first script $T_1$ will become inactive. Check media 82 checks all storage devices connected to server R and storage media engine S. Where new media is present, it will be noted.

There could be more than one media in the particular storage device (where for example the device has a cassette loader). In this case, the program will choose that particular media whose history record shows that was used last for backup by the particular source.

This has a desirable emergent behavior. This will cause automatic rotation of media being used for backup. Media last used will be reused first. For example where first set of storage media $M_1$ has most recently been used by first portable computer $P_1$ for backup, the next full backup will be to second set of storage media $M_2$ for second script $T_2$. Thus storage of the sales information will be distributed. Further, and once one said media has been used, it will not be made available again until it constitutes the oldest media to which backup has occurred.

This leads to poll trigger 90, which is explained in detail in FIG. 6. Referring to FIG. 6, determination is made whether trigger active and ready to poll 91 with respect to any trigger record 30. Thereafter, determination is made that trigger has destination available 92.

It is to be noted that trigger destination available 92 is not checked more than once a minute. This is done to avoid burdening network N with unnecessary traffic.

Presuming the answer is in the affirmative, check source 93 occurs, including the obtaining of the latest defer date requested by the user. For example, delay of a backup may be requested by the user of first portable computer $P_1$ so that a sales order may be entered.

Next, having check source 93, the question is asked is source available 94. If the source is available and has no defer date, or in the dialog asking about a defer date, the determination is made that the source is not available.

Presuming that a defer date has been entered at the source, it will either be prior to the next backup date or after the next backup date. In either event, the requested date will over ride the script date, and backup will be conducted in accordance with the deferral date.

Thereafter, next desired backup now 95 is encountered. Presuming that all computed dates or entered dates are before the present time interval, logic passes to countdown 96. Countdown 96 enables a user, for a typical time period of 20 seconds, to respond to an on screen prompt that warns the user that backup is about to occur. During this interval, the user can either allow backup to commence or alternatively enter into a dialog to defer backup. It is to be remembered that entry into this dialog renders the computer not available for backup—the logic of the backup protocol will route server R and storage media engine S to the next sequential trigger record 30.

Returning to FIG. 5, we go to ready to execute 97. Presuming that it is not user deferred, not open to dialog (on deferral of backup), or not stopped in any way, execute backup 99. At this point, the information of the particular trigger record 30 being polled is sent to server R and storage media engine S. Backup to media results.

What is claimed is:

1. In combination with a network having a plurality of network connected computers, a backup protocol for initiating opportunistic backup of one of the network connected computers to a backup media comprising:

a plurality of network connected computers each having a data source with changing data information;

at least one backup media having stored and dated data from at least one of the data sources of the network connected computers, the stored and dated data including date information related to a date of last backup from the at least one of the data sources of the network connected computers;

a storage data controller for compiling a list of data source to media paths for network connected computers including all data sources available on the network to all media on the network available for backup, and date information of last backup date of each data source to media path;

means in the storage data controller for prioritizing by date all the source to media paths with last backed up source to media path having highest priority, the prioritizing by date occurring before each connection of a network connected computer to a backup media; and, means in the storage data controller for connecting for backup media along the source to media paths for network connected computers where available in order of the prioritizing by date.

2. In combination with a network having a plurality of network connected computers, a backup protocol for initiating opportunistic backup of one of the network connected computers to a backup media according to claim 1 and comprising in further combination:

means in the storage data controller for prioritizing by date source to media paths outside of a minimum backup interval from last backup.

3. In combination with a network having a plurality of network connected computers, a backup protocol for initiating opportunistic backup of one of the network connected computers to a backup media according to claim 1 and comprising in further combination:

the means in the storage data controller for prioritizing by date that is only active during specified time periods.

4. In combination with a network having a plurality of network connected computers, a backup protocol for initiating opportunistic backup of one of the network connected computers to a backup media according to claim 1 and comprising in further combination:

means in the storage data controller for connecting for backup media along the source to media paths where available in order of the prioritizing by date that includes means for permitting the connecting for backup to extend for a set period of time.

5. In combination with a network having a plurality of network connected computers, a backup protocol for initiating opportunistic backup of one of the network connected computers to a backup media according to claim 1 and comprising in further combination:

means at the data sources for delaying connection for backup.

6. In combination with a network having a plurality of network connected computers, a backup protocol for initiating opportunistic backup of one of the network connected computers to a backup media according to claim 1 and comprising in further combination:

means at the data sources for permitting connection for backup at an earliest opportunity.

7. In combination with a network of connected computers, a backup process for opportunistic computer backup comprising the steps of:

providing a plurality of network connected computers all having data sources of changing data;

providing at least one backup media having stored and dated data from at least one of the data sources of the network connected computers, the stored and dated data including date information related to date of last backup from the at least one of the data sources of the network connected computers;

compiling a list of the data sources of the network connected computer to media paths including all data sources of the network connected computers available on the network to all media available for backup;

prioritizing by date information all the data sources of the network connected computers to media paths with last backed computer to media path having highest priority, the prioritizing by date information occurring before each backup of a network connected computer; and, connecting for backup the data sources of the network connected computer to media paths where available in the prioritizing by date information order.

8. In combination with a network of connected computers, a backup process for opportunistic computer backup according to claim 7 comprising the further steps of:

prioritizing by date step that only prioritizes by date source to media paths outside of a minimum back up interval from last backup.

9. In combination with a network of connected computers, a backup process for opportunistic computer backup according to claim 7 comprising the further steps of:

connecting for backup media along the data source of network connected computers to media paths where available in order of the prioritizing by date that includes permitting the connecting for backup to extend for a set period of time.

10. In combination with a network of connected computers, a backup process for opportunistic computer backup according to claim 7 comprising the further steps of:

permitting the source to delay connection for backup.

11. In the combination of a plurality of network connected computers each having at least one data source, a storage media engine for writing to storage media data taken from the at least one data source of the network connected computers, a network interconnecting the storage media engine and the network connected computers, and an intelligent controller for connecting the at least one data source to media path through the network, the improvement of a backup protocol for opportunistic data source backup from a network connected computer through a data path designated by the intelligent controller comprising:

means for determining presence of any one of the plurality of network connected computers each having at least one data source;

at least one backup media in said storage media engine, the at least one backup media having stored and dated data from the at least one data source of the network connected computers having a data source, the stored and dated data including date information related to date of last backup from the at least one data source of the network connected computer;

a script for specifying the data source of the network connected computers comprising the data source, data type from the data source, and backup interval for the data source, and the backup media for data from the data source;

means for determining from the script the data sources of the network connected computers with the at least one data source having time lapses exceeding the backup interval to generate a list of data sources of the network connected computers having expired backup intervals;

memory means in the intelligent controller for compiling a trigger list of data source to media paths including each computer comprising a data source having an expired backup interval, data storage type, and backup media destination;

means in the intelligent controller for generating a prioritized trigger list by expired backup interval with the data source having an oldest expired backup interval having highest priority and the data source having most current expired backup interval having lowest priority, the prioritizing by date occurring before each connection of a network connected computer to a backup media; and, means operatively connected to the intelligent controller for connecting the network connected computer having a first available data source to storage media path through the network in accordance with the prioritized trigger list.

12. The improvement of a backup protocol for opportunistic data source backup from a network connected computer through a data path designated by the intelligent controller according to claim 11 and further comprising:

means in the intelligent controller for generating a prioritized trigger list by expired backup interval that includes a minimum backup interval in generating the backup interval.

13. The improvement of a backup protocol for opportunistic data source backup from a network connected computer through a data path designated by the intelligent controller according to claim 11 and further comprising:

the script for specifying the network connected computers comprising the data source, data type from the data source, and backup interval for the data source, and the backup media for data from the data source is active only during specified time intervals.

14. The improvement of a backup protocol for opportunistic data source backup from a network connected computer through a data path designated by the intelligent controller according to claim 11 and further comprising:

means for connecting for backup media along the source to media paths where available in order of the prioritizing by date; and, means for permitting the connecting for backup to extend for a set period of time.

15. The improvement of a backup protocol for opportunistic data source backup from a network connected computer through a data path designated by the intelligent controller according to claim 11 and further comprising:

the backup protocol utilizes a plurality of scripts.

16. The improvement of a backup protocol for opportunistic data source backup from a network connected computer through a data path designated by the intelligent controller according to claim 11 and further comprising:

means operatively connected to the data sources for permitting backup to be delayed from the data sources.

17. The improvement of a backup protocol for opportunistic data source backup from a network connected computer through a data path designated by the intelligent controller according to claim 11 and further comprising:

the means for determining presence of any one of the plurality of computers actually detects a number of computers less than the plurality.

\* \* \* \* \*